United States Patent [19]
Stover et al.

[11] Patent Number: 5,401,440
[45] Date of Patent: Mar. 28, 1995

[54] INHIBITION OF CATALYZED OXIDATION OF CARBON-CARBON COMPOSITES

[75] Inventors: Edward R. Stover, Akron; Robert P. Dietz, Cleveland, both of Ohio

[73] Assignee: The B. F. Goodrich Company, Akron, Ohio

[21] Appl. No.: 4,152

[22] Filed: Jan. 13, 1993

[51] Int. Cl.$^6$ ............................................. C09K 15/32
[52] U.S. Cl. .................... 252/400.2; 428/408; 427/376.1
[58] Field of Search ...................... 252/400.2; 428/408; 427/376.1

[56] References Cited
U.S. PATENT DOCUMENTS

| | | | |
|---|---|---|---|
| 2,685,539 | 8/1954 | Woodburn et al. | 117/169 |
| 2,685,540 | 8/1954 | Woodburn et al. | 117/169 |
| 2,685,541 | 8/1954 | Woodburn et al. | 117/169 |
| 2,685,542 | 8/1954 | Woodburn et al. | 117/169 |
| 2,867,545 | 1/1959 | Hammen et al. | 428/408 |
| 2,906,632 | 9/1959 | Nickerson | 106/56 |
| 3,029,167 | 4/1962 | Carlson et al. | 117/228 |
| 3,174,872 | 3/1965 | Fisher et al. | 106/56 |
| 3,206,327 | 9/1965 | Diefendorf | 428/408 |
| 3,342,627 | 9/1967 | Paxton et al. | 117/113 |
| 3,351,477 | 11/1967 | Wallouch | 106/56 |
| 3,510,347 | 5/1970 | Strater | 117/169 |
| 3,713,882 | 1/1973 | DeBrunner et al. | 117/169 |
| 4,332,856 | 1/1982 | Hsu | 428/408 |
| 4,439,491 | 3/1984 | Wilson | 428/408 |
| 4,454,193 | 6/1984 | Block | 428/322.7 |
| 4,548,957 | 10/1985 | Hucke | 428/408 |
| 4,617,232 | 10/1986 | Chandler et al. | 428/328 |
| 4,621,017 | 11/1986 | Chandler et al. | 428/328 |
| 4,711,666 | 12/1987 | Chapman et al. | 106/14.12 |
| 4,837,073 | 6/1989 | McAllister et al. | 428/212 |
| 4,865,646 | 9/1989 | Egberg | 106/2 |
| 5,102,698 | 4/1992 | Cavalier et al. | 427/376.1 |

OTHER PUBLICATIONS

European Search Report for EP 94 10 0138 mailed Apr. 27, 1994.
108: 191634r, Carbonaceous Friction Materials With Excellent Oxidation Resistance, Komatsu, Yasukado, Jan. 30, 1988, Chemical Absract vol. 108,1988.
84: 19854n, Oxidation-Resistant Carbonaceous Materials, Shimizu, Kenichi, May 8, 1975. Chemical Abstract vol. 84,1976.
89: 29613a, Oxidation-Resistant Carbon Products, Nakajima, Hiroshi, Jan. 26, 1978. Chemical Abstract vol. 89,1978.
102: 30849a, Manufacture of high temperature Oxidation-Resistant Carbon Materials, Mitsubishi Pencil Co., Ltd., Aug. 14, 1984, Chemical Abstract vol. 102,1985.
109: 97800r, Oxidation-Resistant Carbon Materials, Kawarasaki, Yukio, Jan. 7, 1988. Chimical Abstract vol. 109,1988.

(List continued on next page.)

Primary Examiner—Richard D. Lovering
Assistant Examiner—Valerie Fee
Attorney, Agent, or Firm—William C. Tritt

[57] ABSTRACT

This invention relates to a composition and method of inhibiting catalyzed oxidation of carbon-carbon composites. The invention includes compositions, capable of impregnating carbon-carbon composites, comprising an aqueous mixture of (a) phosphoric acid, (b) a metal phosphate, and (c) a penetration and retention improving amount of a compatible wetting agent selected from the group consisting of polyols, alkoxylated monohydric alcohols, and mixtures thereof. The invention also includes a method of inhibiting catalyzed oxidation of carbon-carbon composites comprising the steps of treating a carbon-carbon composite with the catalyzed oxidation inhibiting aqueous mixture, and heating the treated carbon-carbon composite to a temperature sufficient to remove water. Articles, including friction brakes, made by this method are also part of this invention. Treated brake lugs, and other exposed areas of aircraft braking systems have improved resistance to catalyzed oxidation.

12 Claims, No Drawings

OTHER PUBLICATIONS

94: 144319z, Prevention of Oxidation of Carbon Carbon-Graphite Graphite-Coated, and Graphite-Grog Products. Gierek, Adam, Jan. 31, 1980. Chemical Abstract vol. 94,1981.

F. K. Earp and M. W. Hill, Oxidation of Carbon and Graphite pp. 326–333.

The Catalyzed Gasification Reactions of Carbon, D. W. McKee Corporate Research & Development Center, General Electric Co., New York. Chemistry and Physics of Carbon, 1965 pp. 1–117.

69–08178A, Protective Mechanism of Phosphorus-Containing Coatings Suvorov, S. A.; Chaikun, E. V.; Korobkin, S. L.; et al., Ogneupory, 1988, No. 9 pp. 24–27. Ceramics Abstracts.

Extended Abstracts and Program, American Carbon Society, Jul., 1983, Inhibition of Graphite Oxidation, D. W. McKee et al..

The Inhibition of Graphite Oxidation by Phosphorus Additives, D. W. McKee et al. May 17, 1983, Carbon vol. 22, No. 3, pp. 285–290.

Effect of Adsorbed Phosphorus Oxychloride on the Oxidation Behavior of Graphite, D. W. McKee, Mar. 1, 1972, Carbon vol. 10 pp. 491–497.

INHIBITION OF CATALYZED OXIDATION OF CARBON-CARBON COMPOSITES

TECHNICAL FIELD OF THE INVENTION

This invention relates to a method and composition useful in inhibiting catalyzed oxidation of carbon-carbon composites.

BACKGROUND OF THE INVENTION

Many aircraft utilize a stack of carbon composite discs in brakes that can absorb large amounts of kinetic energy required to stop the aircraft during landing or in the event of a rejected take-off. During some of the stops, the carbon is heated to sufficiently high temperatures that surfaces exposed to air will oxidize. Carbon composites with thermal and mechanical properties required for specific brake designs have been prepared. However, these composites have had residual open porosities (typically 5% to 10%) which permit internal oxidation. The internal oxidation weakens material in and around the brake rotor lugs or stator slots. These areas transmit the torque during braking. One simple, low-cost method of minimizing loss of strength and structural integrity is application of phosphoric acid to non-wear surfaces of brake discs, followed by baking to 650° C. This method inhibits normal oxidation of carbon sufficiently for many applications, including aircraft brakes.

However, some commercial transport brakes have suffered crushing in the lugs or stator slots. The damage has been associated with visible surface oxidation and oxidation enlargement of cracks around fibers. The enlargement occurs at depths up to 0.5 inch beneath the exposed surfaces. Potassium or sodium has been identified in the severely oxidized regions. Alkali and alkaline earth elements are well known to catalyze carbon oxidation. Catalyzed oxidation is carbon oxidation that is accelerated by the presence of contaminating materials. These contaminating materials come into contact with the brake from cleaning and de-icing chemicals used on aircraft. Sodium can originate from salt deposits left from seawater or sea spray. These liquids, and other deicers or cleaners containing K or Na, can penetrate the porous carbon discs leaving catalytic deposits within the pores. When such contamination occurs, the rate of carbon loss by oxidation can be increased by one to two orders of magnitude. There is a need to provide protection against such catalyzed oxidation.

McKee points out that phosphates can deactivate catalytic impurities in carbon by converting them to inactive, stable phosphates (D. W. McKee, *Chemistry and Physics of Carbon* 16, P. I. Walker and P. A. Thrower eds., Marcel Dekker, 1981, p. 30.)

Woodburn and Lynch (U.S. Pat. No. 2,685,539) describe several ways of impregnating pores in carbon or graphite with aluminum phosphate. They specified compositions having a molar ratio of $Al_2O_3$: $P_2O_5$ between 0.2:1 and 0.8:1. Application methods included brushing, spraying or soaking in solutions, including $Al(H_2PO_4)_3$ dissolved in aqueous HCl.

U.S. Pat. No. 4,439,491, issued to Wilson, relates to carbon or graphite protected against oxidation by application of a solution comprising monoammonium phosphate, zinc orthophosphate, phosphoric acid, boric acid, cupric oxide, and wetting agent in water.

U.S. Pat. No. 4,837,073, issued to McAllister et al., relates to a barrier coating and penetrant providing oxidation protection for carbon-carbon materials. The method involves penetrating a barrier coating for carbon-carbon materials with an oxygen inhibitor.

It is desirable to have a simple, effective method and composition to inhibit catalyzed oxidation of carbon.

SUMMARY OF THE INVENTION

This invention relates to a composition and method of inhibiting catalyzed oxidation of carbon-carbon composites. The invention includes compositions, capable of impregnating and inhibiting catalyzed oxidation of carbon-carbon composites, comprising an aqueous mixture of (a) phosphoric acid, (b) a metal phosphate, and (c) a penetration and retention improving amount of a compatible wetting agent selected from the group consisting of polyols, alkoxylated monohydric alcohols, and mixtures thereof.

The invention also includes the method of inhibiting catalyzed oxidation of carbon-carbon composites comprising the steps of treating a porous carbon-carbon composite with a catalyzed oxidation inhibiting amount of an aqueous mixture comprising a metal phosphate, phosphoric acid, and a compatible wetting agent selected from the group consisting of polyols, alkoxylated monohydric alcohols, and mixtures thereof and heating the coated carbon-carbon composite to a temperature sufficient to remove water. Articles, including friction brakes, made by this method are also part of this invention. The compositions and method show improved penetration and retention of the catalyzed oxidation inhibitors.

DESCRIPTION OF THE PREFERRED EMBODIMENTS

As used in the specification and claims, the term "retention" refers to preventing the migration of the liquid impregnant from the pores of the carbon-carbon deposit to the surface thereof upon heating. This invention is particularly useful for aircraft brakes which operate at temperatures up to about 700° C. during normal service. It is in the lower temperature range, e.g. above about 400° C., that the effect of catalytic oxidation is most severe in allowing more rapid degradation of a carbon body's strength by oxidation internally from air diffusing into the pores. Application of this invention provides a means for significantly extending the service life of carbons by preventing catalyst-accelerated, internal oxidation.

In order to protect carbon from rapid oxidation by catalysis from Na, K, or other metals in contaminating liquids encountered during service, metal phosphate deposits should be distributed uniformly throughout the pores (e.g. with not more than ~1 mm separation between deposits) to a depth sufficient to cover the range affected by $O_2$ diffusing in from exposed surfaces (~1 cm). The process described here has provided such deposits when the carbon is heated in service to the range 400° C. to 700° C. (but below ~1040° C.).

Carbon-carbon composites are generally prepared from carbon preforms. Carbon preforms are made of carbon fibers, which may be formed from preoxidized acrylonitrile resin. In one embodiment, these fibers can be layered together to form a shape, such as a friction brake. The shape is heated and infiltrated with methane or another pyrolyzable carbon source to form the carbon-carbon composites. Carbon-carbon composites and methods of their manufacture are known to those in the art. In one embodiment, the carbon-carbon composite has a density from about 1.6 to about 1.9 g/cm$^3$. A particularly useful carbon-carbon composite has a density of about 1.7 g/cm$^3$.

The carbon-carbon composites are impregnated with an aqueous mixture of (a) phosphoric acid, (b) a metal phosphate, and (c) a penetration and retention improving amount of a compatible wetting agent selected from the group consisting of polyols, alkoxylated monohydric alcohols, and mixtures thereof. The wetting agents used in this invention are compatible with the aqueous mixture of phosphoric acid and metal phosphate. In one embodiment, the aqueous composition is free of boric acid and metal borates. In another embodiment, the aqueous composition is free of hydrochloric acid.

The aqueous composition includes a metal phosphate. Illustrative examples of useful metal phosphates include manganese, zinc and aluminum phosphates. In one embodiment, the metal phosphate is aluminum phosphate, preferably mono-aluminum phosphate ($Al(H_2PO_4)_3$).

In the aqueous compositions, the molar ratio of aluminum to phosphorus is generally from about 0.2 up to about 0.8 (aluminum) to one (phosphorus). The aqueous composition generally contains from about 40%, or about 45%, or about 50% up to 70%, or to about 65% by weight water. The phosphoric acid (A) is present in an amount from about 50%, or about 55%, or about 60% up to about 75% or to about 70% by weight of combination of (A) and (B). The metal phosphate (B) is present in an amount from about 25%, or about 30%, up to about 50%, or to about 45%, or to about 40% by weight of the combination of (A) and (B).

The aqueous compositions of the present invention additionally contain a compatible wetting agent. The wetting agent is selected from the group consisting of polyols, alkoxylated monohydric alcohols, and mixtures thereof. The wetting agent is present in an amount sufficient to improve the penetration and retention of the metal phosphate and phosphoric acid. The wetting agent is typically present in an amount from about 0.3%, or about 0.5%, or about 0.75% up to about 3%, or to about 2%, or to about 1.5% by weight of the combination of the phosphoric acid (A) and the metal phosphate (B). In one embodiment, the wetting agent is present in an amount from about 0.5% to about 1% by weight of the combination of (A) and (B). The wetting agent is generally present in the aqueous mixture in an amount from about 0.1%, or about 0.3% up to about 2%, or to about 1% by weight of the aqueous mixture.

When the wetting agent is a polyol, it geneally contains two, three, or four hydroxyl groups, preferably two hydroxyl groups. In one embodiment, the polyol is alkoxylated. In another embodiment, the polyol is an acetylenic polyol. The acetylenic polyol may be branched. Examples of acetylenic polyols include dimethylhexynol, dimethyloctynediol, and tetramethyldecynediol. Acetylenic polyols are available commercially from Air Products & Chemicals, Inc. under the tradename Surfynol. An example of a useful acetylenic polyol is Surfynol 104.

The acetylenic polyol may also be alkoxylated. These materials are generally prepared by treating an acetylenic polyol with an epoxide, such as ethylene oxide, propylene oxide, etc. An example of a useful alkoxylated acetylenic polyol is Surfynol 440.

The wetting agent may also be an alkoxylated monohydric alcohol. The alkoxylated monohydric alcohols are generally prepared by reacting a monohydric alcohol with an epoxide, such as those epoxides described above. In one embodiment the alcohol contains from about 8, or about 10 up to about 24, or to about 18 carbon atoms. The alkoxylated monohydric alcohol may be an alkoxylated linear alcohol. An example of a useful alkoxylated alcohol is Polytergent SL-62 available commercially from Olin Corporation.

In one embodiment, the invention relates to a composition consisting essentially of a phosphate oxidation inhibiting mixture, and a penetration and retention improving amount of a compatible wetting agent selected from the group consisting of polyols, alkoxylated monohydric alcohols, and mixtures thereof. The phosphate oxidation inhibiting mixtures are those which inhibit catalyzed oxidation of the carbon-carbon composites. These mixtures include metal phosphates and phosphoric acid as described above. The wetting agents also are described above.

The invention also relates to a method of inhibiting catalyzed oxidation of carbon-carbon composites comprising the steps of treating a carbon-carbon composite with a catalyzed oxidation inhibiting amount of an aqueous mixture comprising a metal phosphate, phosphoric acid, and a compatible wetting agent selected from the group consisting of polyols, alkoxylated monohydric alcohols, and mixtures thereof and heating the treated carbon-carbon composite to a temperature sufficient to remove water. In one embodiment, the aqueous mixture is applied to regions exposed to oxidation, such as brake stators and lugs. The mixture is prepared by blending the components of the mixture. In one embodiment, the components are mixed ultrasonically. Typically the method occurs at atmospheric pressure. The aqueous mixture may be applied by any means known to those in the art, including painting, dipping, spraying, etc.

The treated carbon-carbon composites are then heated to remove water. In one embodiment, the heating is done in an inert atmosphere, such as a nitrogen atmosphere. The treated carbon-carbon composites are generally heated to a temperature from about 350° C., or about 450° C. or about 550° C. up to about 900° C., or to about 750° C., or to about 650° C. In one embodiment, the treated carbon-carbon composites are heated to about 600° C. to about 700° C.

The invention also includes articles made by the above described process. In one embodiment, the invention relates to friction brakes made by the above method.

The following examples relate to the aqueous compositions and methods of the present invention. Unless otherwise indicated, throughout the specification and claims, parts are parts by weight, temperatures are degrees Celsius, and pressure is atmospheric pressure.

EXAMPLE 1

An aqueous mixture is prepared by mixing 60 parts of a 50% by weight of an aqueous mixture of mono-aluminum phosphate available from Stauffer Chemical, 20 parts of 85% by weight phosphoric acid aqueous solution, 20 parts of water, and 0.5 parts of alkoxylated tetramethyldecynediol (Surfynol 440). The aqueous mixture is ultrasonically agitated for 30 minutes. The mixture is painted onto a carbon-carbon composite so that pores near the painted surface are impregnated, and the carbon-carbon composite thus treated is heated to 650° C. under nitrogen.

EXAMPLE 2

The procedure of Example 1 is followed except 0.5 parts of tetramethyldecynediol (Surfynol 104) is used in place of alkoxylated tetramethyldecynediol.

EXAMPLE 3

The procedure of Example 1 is followed except 0.5 parts of an alkoxylated linear alcohol (Polytergent SL-62) is used in place of alkoxylated tetramethyldecynediol.

Experimental

Coupons, approximately 2.5 cm by 2.5 cm by 0.6 cm, are cut from brake material, manufactured by densification of a fiber preform by chemical vapor infiltration/-deposition of carbon (CVI-C). In one embodiment, the carbon is further subjected to a heat treatment at about 2200° C. Oxidation tests are conducted by comparing weight loss in a lot of 12 to 20 coupons during isothermal exposures in flowing air at temperatures between about 480° C. and 705° C. The times are shown below in Table 1. The time and temperature profiles simulate aircraft landings. The longer times (except for overnight holds) are broken into two or four increments to allow shifting of coupon locations to compensate for temperature gradients within the furnace.

TABLE 1

| Furnace Test Temperature (°C.) | Minutes at Temperature in Oxidation Tests | | | | |
|---|---|---|---|---|---|
| | 482° C. | 538° C. | 593° C. | 649° C. | 704° C. |
| 1. First 600 Landings | 900 | 64 | 104 | — | — |
| 2. + Next 600 Landings | 960 | 226 | 52 | 70 | — |
| 3. + Next 400 Landings | 1260 | 382 | 126 | 30 | 27 |

The three conditions equal a total of 1600 landings.

Coupons are placed on $Al_2O_3$ supports and inserted into the preheated furnace. After removal, weights are subtracted from the as-inhibited weight, obtained after heating 5-6 minutes at 593° C. in air, and divided by the uninhibited dry carbon weight to compare carbon weight loss after successive "landings". Following an initial oxidation equivalent to "1200 landings" to simulate initial service, contamination is simulated by soaking specimens for about 5 minutes in seawater containing 10.8 mg/ml Na, 1.46 mg/ml Mg, 0.43 mg/ml K and 0.33 mg/ml Ca (all oxidation catalysts). In some tests, coupons are soaked instead in a solution of runway deicer. The runway deicer (E36) contains about 51% potassium acetate and is manufactured by Cryotech Deicing Technology. Samples for testing are supplied by Chevron Chemical Company. After contamination, the coupons are first dried and then are heated for 5 minutes at 593° C.; the weight increase (~0.1% of the carbon weight) is added to the previous weight from which later weights were subtracted to calculate percent carbon lost.

Coupons are treated with St-A, mono-aluminum phosphate (Stauffer Chemical Co., 50% $Al(H_2PO_4)_3$), or M-1, the product of Example 1 and are exposed to oxidation as described above. Table 2 contains data comparing coupons inhibited with aluminum phosphate and coupons treated with the compositions of the present invention. Table 2 contains data showing the weight change associated with the inhibitor treatment, pre-oxidation equivalent to 1200 landings, and seawater treatment of the coupons, as well as, the weight loss associated with oxidation equivalent to 600 and 1600 landings. Note that inhibition was more difficult in carbon without a final heat treatment, where weight increase after inhibition was less. The M-1 of Example 1 was more effective than St-A even though less inhibitor was added.

TABLE 2

| Treatment | | Weight Change[1], % | | | | |
|---|---|---|---|---|---|---|
| % Wt. | Inhibitor | +Inhibitor | 1200 Ldgs | +Seawater | 600 Ldgs | 1600 Ldgs |
| | 2-Propanol Wash + 149° C. 1-Hour Dry | | | | | |
| A — | St-A[2] | +1.83 | −0.12 | +0.05 | −1.89 | −8.05 |
| — | M-1[3] | +1.19 | −0.16 | +0.06 | −0.98 | −4.53 |
| B* — | St-A | +3.09 | −0.05 | +0.10 | −0.41 | −1.60 |
| — | M-1 | +2.40 | −0.20 | +0.16 | −0.37 | −1.22 |
| | $HNO_3$ Soak + 149° C. 1-Hour Dry | | | | | |
| C +0.02 | St-A | +2.27 | −0.12 | +0.06 | −1.16 | −3.80 |
| +0.02 | M-1 | +1.13 | −0.16 | +0.06 | −0.81 | −2.90 |
| D* +0.04 | St-A | +4.57 | −0.08 | +0.07 | −0.19 | −0.55 |
| +0.04 | M-1 | +2.45 | −0.21 | +0.05 | −0.29 | −0.52 |
| | 649° C. Bake In $N_2$ | | | | | |
| E +0.002 | St-A | +1.93 | −0.15 | +0.07 | −1.76 | −6.03 |
| +0.007 | M-1 | +1.63 | −0.14 | +0.09 | −1.04 | −3.71 |
| F* +0.055 | St-A | +2.31 | −0.06 | +0.15 | −0.72 | −2.95 |
| +0.062 | M-1 | +2.22 | −0.18 | +0.17 | −0.29 | −0.95 |

*Carbon coupons with final heat treatment having more graphitic surface structures than coupons without final heat treatment.
1. Weight change divided by initial carbon weight of coupon.
2. St-A = Stauffer Chemical Co. 50% $Al(H_2PO_4)_3$.
3. M-1 = 60% St-A + 20% $H_3PO_4$ (85%) + 20% $H_2O$ + 0.5% addition of Surfynol 440 (Air Products & Chemicals).

These data show that carbon treated with the compositions and methods of the present invention are better protected against catalyzed oxidation, e.g. have less weight loss, compared to carbon treated with aluminum phosphate.

Table 3 contains data showing the effectiveness of differing levels of wetting agent on carbon weight loss.

TABLE 3

| Surfact. % in M-1 | Wt. Change, % | | | 600 Ldgs | 1600 Ldgs |
|---|---|---|---|---|---|
| | +Inhib. | 1200 Ldgs* | +Seawater | | |
| 0.3 | +2.12 | −0.11 | +0.11 | −1.59 | −10.24 |
| 0.5* | +1.47 | −0.12 | +0.07 | −1.21 | −6.75 |
| 0.5* | +0.97 | −0.18 | +0.09 | −3.12 | −17.27 |
| 0.5 | +1.39 | −0.13 | +0.10 | −1.16 | −7.39 |
| 0.5 | +0.81 | −0.14 | +0.08 | −1.67 | −10.08 |
| 0.5 | +2.23 | −0.12 | +0.14 | −1.14 | −7.49 |
| 0.5 | +2.07 | −0.15 | +0.09 | −1.88 | −12.76 |
| 1.0 | +2.06 | −0.14 | +0.10 | −1.21 | −7.29 |
| 1.0 | +1.79 | −6.14 | +0.08 | −1.56 | −9.66 |

Notes:
* = Aged solution (others mixed within 2 months);

As a test of the effectiveness of the preferred composition and processing method against oxidation catalyzed by potassium in runway deicer, coupons are painted with either phosphoric acid or "M-1", described above. The coupons are baked together in an oven heated to 649° C. They are then preoxidized in cycles equivalent to either 1200 landings or 600 landings, and are contaminated by soaking for 5 minutes in solutions with increasing amounts of runway deicer E36 added to deionized water. In these tests, the "landings" after contamination are simulated by oxidation in flowing air in a furnace which is cooled from a maximum temperature at the temperatures and for times shown in Table 4.

TABLE 4

COOLING PROFILES FOR "LANDINGS" SIMULATION OF CARBON OXIDATION

Temp., °C. Time, Minutes, For Cooling At A Uniform Rate In "Landings"

| From | To | 1–600 | 601–800 | 801–1000 | 1001–1200 | 1201–1400 | 1400–1600 |
|---|---|---|---|---|---|---|---|
| 704 | 677 |  |  |  | 6 | 8 | 14 |
| 677 | 649 |  | 6 | 10 | 7 | 6 | 6 |
| 649 | 621 | 15 | 7 | 7 | 7 | 7 | 7 |
| 621 | 593 | 24 | 7 | 7 | 8 | 8 | 30 |
| 593 | 566 | 22 | 8 | 8 | 8 | 36 | 66 |
| 566 | 538 | 27 | 12 | 20 | 51 | 71 | 77 |
| 538 | 510 | 33 | 24 | 54 | 76 | 100 | 140 |
| 510 | 482 | 56 | 108 | 194 | 256 | 252 | 236 |
| 482 | 454 | 641 | 261 | 209 | 153 | 188 | 246 |
| 454 | 427 | 553 | 182 | 235 | 352 | 414 | 500 |

Table 5 contains data of the treatment levels of inhibitor and deicer, as well as the weight gain associated with those treatments. Table 6 contains data showing weight loss under catalyzed oxidation conditions.

TABLE 5

EFFECT OF E36 POTASSIUM ACETATE RUNWAY DEICER ON CARBON OXIDATION

| % Surf. in M-1 | E36 % | +Inhib. & 593° C. | Total "Landings" 600 | Total "Landings" 1200 | +E36 & 300° C. |
|---|---|---|---|---|---|
| \multicolumn{6}{c}{"M-1" Inhibited} |
| 1.0 | 30 | +2.02 | −0.06 | −0.22 | +0.29 |
| 1.0 | 30 | +2.30 | −0.05 | −0.20 | +0.42 |
| 1.0 | 10 | +2.25 | −0.06 | −0.21 | +0.11 |
| 1.0 | 10 | +1.54 | −0.06 | −0.21 | +0.09 |
| 1.0 | 3 | +2.28 | −0.05* | NA | +0.03 |
| 1.0 | 3 | +1.26 | −0.06* | NA | +0.03 |
| 0.5 | 3 | +1.92 | −0.05* | NA | +0.01 |
| 0.5 | 3 | +1.97 | −0.05* | NA | +0.02 |
| \multicolumn{6}{c}{$H_3PO_4$ Inhibited} |
| — | 30 | +0.04 | −0.06 | −0.58 | +0.68 |
| — | 30 | +0.04 | −0.05 | −0.52 | +1.03 |
| — | 10 | +0.03 | −0.04 | −0.51 | +0.26 |
| — | 10 | +0.03 | −0.05 | −0.54 | +0.20 |
| — | 3 | +0.41 | −0.06* | NA | +0.05 |
| — | 3 | +0.12 | −0.04* | NA | +0.05 |
| — | 1 | +0.15 | −0.06* | NA | +0.00 |
| — | 1 | +0.24 | −0.06* | NA | +0.00 |

Note:
*Oxidized in 1–600 cooling cycle in Table 4

TABLE 6

| % Surf. in M-1 | % E36 Deicer | 601–800 | 801–1000 | 1001–1200 | 1201–1400 | 1401–1600 |
|---|---|---|---|---|---|---|
| 1.0 | 30 | NA | NA | NA | −5.32 | −7.56 |
| 1.0 | 30 | NA | NA | NA | −5.17 | −7.58 |
| 1.0 | 10 | NA | NA | NA | −2.35 | −3.84 |
| 1.0 | 10 | NA | NA | NA | −2.89 | −4.65 |
| 1.0 | 3 | −0.09 | −0.11 | −0.18 | −0.27 | −0.53 |
| 1.0 | 3 | −0.19 | −0.23 | −0.37 | −0.58 | −1.13 |
| 0.5 | 3 | −0.09 | −0.11 | −0.18 | −0.30 | −0.59 |
| 0.5 | 3 | −0.08 | −0.10 | −0.15 | −0.25 | −0.53 |
| \multicolumn{7}{c}{$H_3PO_4$ Inhibited} |
| — | 30 | NA | NA | NA | −100 | −100 |
| — | 30 | NA | NA | NA | −100 | −100 |
| — | 10 | NA | NA | NA | −100 | −100 |
| — | 10 | NA | NA | NA | −100 | −100 |
| — | 3 | −2.71 | −4.57 | −8.87 | −13.08 | −19.12 |
| — | 3 | −11.25 | −16.45 | −26.39 | −34.80 | −46.01 |
| — | 1 | −0.80 | −1.40 | −2.98 | −4.69 | −7.54 |
| — | 1 | −0.13 | −0.21 | −0.53 | −0.96 | −2.28 |

As shown, the coupons oxidize more rapidly with increasing amounts of deicer contamination, and the inhibited coupons are effectively protected. Some protection results if metal phosphate is formed from contamination of $H_3PO_4$-treated coupons resulting in a greater weight increase during bake.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A method of inhibiting catalyzed oxidation of carbon-carbon composites comprising the steps of treating a carbon-carbon composite with an oxidation inhibiting amount of an aqueous mixture comprising (a) a metal phosphate, (b) phosphoric acid, and (c) a compatible wetting agent selected from the group consisting of acetylenic polyols, alkoxylated acetylenic polyols, alkoxylated monohydric alcohols, and mixtures thereof and heating the treated carbon-carbon composite to a temperature sufficient to remove water.

2. The method of claim 1 wherein the metal phosphate is mono-aluminum phosphate.

3. The composition method of claim 2 wherein the molar ratio of aluminum to phosphorus is from about 0.2:1 to about 0.8:1.

4. The method of claim 1 wherein (c) is an acetylenic polyol or an alkoxylated acetylenic polyol.

5. The method of claim 1 wherein (c) is tetramethyldecynediol or alkoxylated tetramethyldecynediol.

6. The method of claim 1 wherein (c) is an alkoxylated monohydric alcohol prepared by reacting a monohydric alcohol having about 8 to about 24 carbon atoms with an epoxide.

7. The method of claim 1 wherein water is present in an amount from about 40% up to 70% by weight of the aqueous composition, (a) is present in an amount from about 50% up to about 75%, (b) is present in an amount from about 25% up to about 50%, (c) is present in an amount from about 0.1% to about 2% by weight, wherein the amounts of (a), (b), and (c) are based on the combination of (a) and (b).

8. The method of claim 1 wherein (c) is present in an amount from about 5% to about 1% by weight.

9. The method of claim 1 wherein the process occurs at atmospheric pressure.

10. The method of claim 1 wherein the treated carbon-carbon composite is heated to a temperature from about 350° C. to about 900° C.

11. The method of claim 1 wherein the treated carbon-carbon composite is heated to a temperature from about 600° C. to about 700° C.

12. The method of claim 1 wherein the carbon-carbon composite is suitable for use as a friction disk.

* * * * *